Figure 1:
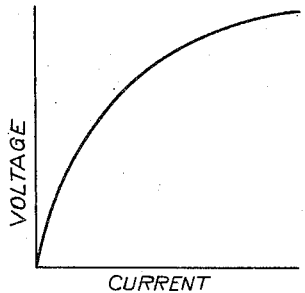

April 18, 1933.                E. HOROWITZ                1,904,465
                            ELECTRICAL REGULATOR
                             Filed Jan. 15, 1931

Inventor:
Eugen Horowitz,
by Charles E. Mullen
His Attorney.

Patented Apr. 18, 1933

1,904,465

UNITED STATES PATENT OFFICE

EUGEN HOROWITZ, OF HALENSEE, GERMANY, ASSIGNOR TO GENERAL ELECTRIC COMPANY, A CORPORATION OF NEW YORK

ELECTRICAL REGULATOR

Application filed January 15, 1931, Serial No. 508,953, and in Germany February 11, 1930.

My invention relates to electrical regulators and particularly to quick acting regulators for dynamo electric machines.

Present day electrical power transmission networks are almost exclusively constant voltage alternating current systems containing synchronous dynamo electric machines. In order that the variations in power flow in such systems shall not cause corresponding voltage variations, it is customary to provide the synchronous machines with automatic voltage regulators which control the excitation of these machines in accordance with the tendency of the voltage to depart from the rated voltage of the machines. For a given value of power transfer, the excitation of the synchronous machines is therefore fixed.

Now it is well known that the value of power transfer at which interconnected synchronous machines will fall out of synchronism is proportional to the degree of excitation of these machines. Under ordinary circumstances of load change the usual voltage regulators in performing their function of maintaining constant voltage will prevent the machines from falling out of step with increases in load. However, these regulators usually involve moving parts having a certain amount of inertia and in addition these moving parts are usually damped in order to prevent hunting. They, therefore, operate with a certain unavoidable time delay.

There are times when networks are subjected to sudden disturbances involving the instantaneous application of large loads, such as the occurrence of short circuits or during certain switching operations. At such times it not infrequently happens that the synchronous machines pull apart because the regulators have not acted quickly enough.

In accordance with my invention I provide extremely simple means, involving no moving, fragile or expensive parts, which acts instantaneously to vary the excitation of a dynamo electric machine in accordance with variations in an electrical condition of this machine and which may either be used alone or as an auxiliary regulator to the ordinary regulator. I attain this end through the use of a resistance material whose electrical resistance changes with changes in, voltage across it or, current through it.

Various quick acting regulators have been devised for the purpose of overcoming the above described difficulty but for one reason or another, such as high cost or delicacy or complexity they have not been wholly satisfactory.

An object of my invention is to provide a novel quick acting electrical regulator which is extremely simple and inexpensive.

Another object of my invention is to provide a quick acting electrical regulator which involves no moving parts or electric valves.

My invention will be better understood from the following description taken in connection with the accompanying drawing and its scope will be pointed out in the appended claims.

Figure 2:
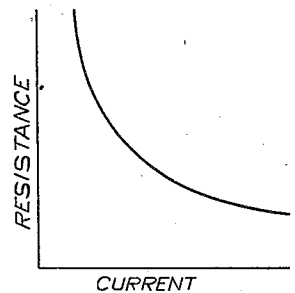
Figure 3:
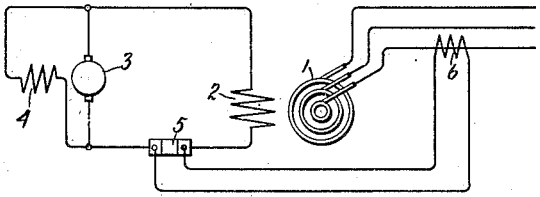
Figure 4:
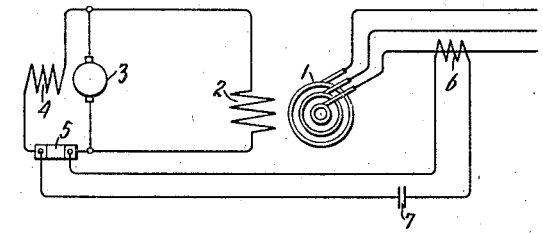
Figure 5:
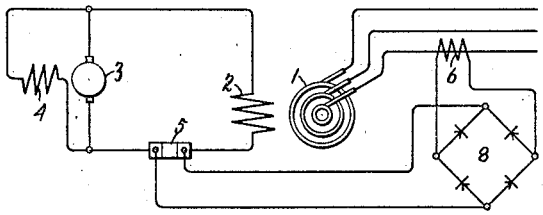

In the drawing Figs. 1 and 2 represent respectively the voltage-current and the resistance-current characteristics of a resistance element employed in a preferred embodiment of my invention, Fig. 3 illustrates a very simple embodiment of my invention applied to an alternating current generator, Fig. 4 is a modification of Fig. 3, Fig. 5 is a further modification of Fig. 3.

Referring now to Fig. 3 of the accompanying drawing 1 is the armature of a three-phase alternating current generator which has a field winding 2 which is energized from the armature 3 of an exciter. This exciter has a shunt field winding 4. Connected in the circuit of the field winding 2 is a special resistance element 5, across which is connected the secondary winding of a current transformer 6 which is in one of the external conductors of armature 1.

As shown in Fig. 1 the current through the resistance element 5 increases rapidly with increases in voltage across it while Fig. 2 illustrates another aspect of the characteristics of resistance element 5 in that it shows how the resistance decreases rapidly with increases in current through the element. Any resistance elements possessing the general characteristics illustrated by Figs. 1 and 2 may be employed. Some of these resistances, like carbon for example, depend for their action upon a change in thermal condition which is brought about by the increase in heating due to the increase in current through them. Such resistance elements are not as quick acting as those whose electrical resistance changes as a function of the applied voltage only and consequently I prefer to use a resistance element of the latter type. One such element is a synthetic voltage-dependent resistance material consisting of a fired mixture of carborundum, clay and carbon which has the property of instantaneously reducing its electrical resistance with increases in applied voltage. Such a synthetic resistance is described and claimed in Patent No. 1,822,742, granted September 8, 1931, on an application of Karl B. McEachron, and which is assigned to the assignee of the present application.

The operation of the embodiment of my invention illustrated in Fig. 3 is as follows. As the load on the main generator increases the voltage induced in the secondary winding of current transformer 6 increases proportionately with the increase in load current. Consequently the voltage applied across resistance element 5 increases with the result that its electrical resistance decreases instantaneously an amount which is proportional but not necessarily directly proportional to the increase in load current of the main generator. The effect of this decrease in the resistance in the field circuit of the main generator is to increase the field current and consequently the excitation of the main generator. The arrangement illustrated in Fig. 3, therefore, accomplishes the desired result of quickly increasing the excitation of a dynamo electric machine in accordance with the increases in load upon it.

It should be understood that the embodiment of my invention illustrated in Fig. 3 is merely a preferred embodiment and that in its broadest aspects my invention is not limited to the use of a series element whose electrical resistance decreases with increase in current or terminal voltage. For example, it will occur to those skilled in the art that the same result may be secured through the use of an element whose electrical resistance increases with increases in current through it, such as a length of pure iron wire, which is connected in parallel with the field winding without departing from my invention in its broadest aspects.

Although in Fig. 3 I have illustrated my invention as applied to a three-phase synchronous generator it will readily occur to those skilled in the art that my invention is not limited in application to such a machine and that the number of phases may be as many or as few as desired. Furthermore, it will also be obvious to those skilled in the art that my invention is equally applicable to synchronous motors or condensers, in both of which it is desirable to increase the excitation rapidly as load changes on such machines occur. It will also be obvious to those skilled in the art that my invention is not limited in its application to alternating current machines. Of course, with direct current machines the need for quick excitation is not as great as with alternating current machines. Nevertheless, the regulating arrangement illustrated in Fig. 3 would be useful as an adjunct to the ordinary slow acting regulator which is applied to a direct current machine. Thus, as the load change on the direct current machine occurs the change in current will induce the voltage in the secondary winding of current transformer 6 which will produce the desired resistance change in the excitation circuit.

With the arrangement illustrated in Fig. 3 the resistance of the secondary winding of current transformer 6 should be high with respect to the resistance of element 5 for best operation. This is because some of the direct current flowing in the field winding 2 will tend to flow through the secondary winding of current transformer 6 instead of all flowing through resistance element 5. If this current is high enough it will produce saturation in current transformer 6 with the result that its secondary voltage will no longer be a true index of the current flowing in the external circuit of the main generator. To eliminate the possibility of such an occurrence a condenser may be placed in the circuit of secondary winding 6. Such an arrangement is illustrated in Fig. 4. This figure also differs from Fig. 3 in that the resistance element 5 is in the exciter field circuit instead of in the main generator field circuit. With this arrangement equal changes in electrical resistance of element 5 produce larger changes in the excitation of the main generator than when resistance element 5 is in the main generator field circuit.

The operation of the arrangement illustrated in Fig. 4 is fundamentally the same as the operation of the arrangement illustrated in Fig. 3. The function of condenser 7 is to prevent the flow of direct current in the secondary winding of current transformer 6 thus preventing saturation by the direct current which otherwise would tend to flow in this winding.

Due to the fact that an alternating voltage is impressed across resistance element 5 in both Figs. 3 and 4 an alternating voltage will be inserted in the field winding circuit of the main generator of Fig. 3 and in the field winding circuit of the exciter in Fig. 4. In most practical applications of my invention this effect, however, will be negligible because of the large inductance of the field winding of the main generator of Fig. 3 and of both the main generator and the exciter o Fig. 4. However, any possibility of adversely affecting the wave form of the main generator in this manner may be avoided by inserting a rectifier between the secondary winding of the current transformer 6 and the resistance element 5. Such an arrangement is illustrated in Fig. 5 where a full wave dry contact rectifier 8 is inserted between the secondary winding of current transformer 6 and the resistance element 5. My invention is obviously not limited to the use of a full wave rectifier but I prefer such a rectifier to a half-wave rectifier because when the latter is used the secondary winding of current transformer 6 is virtually open circuited during alternate half cycles. During overload and short circuit conditions this might have the effect of injuring the insulation of the current transformer due to the high voltages produced.

The operation of the embodiment of my invention illustrated in Fig. 5 is essentially the same as the operation of the embodiments illustrated in Figs. 3 and 4. As the increases in load occur on the main generator the voltage of the secondary winding of the current transformer 6 increases and this voltage is applied to resistance 5 as a direct current voltage. This has the effect of greatly reducing the resistance of element 5 with the result that the excitation of the main generator is quickly increased. It should be noted that in the arrangement illustrated in Fig. 5 that the rectifier 8 also prevents a flow of direct current in the secondary winding of current transformer 6.

While I have shown and described particular embodiments of my invention it will be obvious to those skilled in the art that changes and modifications may be made wthout departing from my invention and I, therefore, aim in the appended claims to cover all such changes and modifications as fall within the true spirit and scope of my invention.

What I claim as new and desire to secure by Letters Patent of the United States, is:

1. In combination, a dynamo electric machine, an excitation controlling circuit for said dynamo electric machine, a resistance element whose electrical resistance changes instantaneously with the voltage which is applied to it connected in said circuit, and means for varying the voltage applied to said resistance in accordance with variations in an electrical condition of said machine.

2. In combination, a dynamo electric machine, an excitation controlling circuit for said machine, a resistance element whose electrical resistance decreases instantaneously with increases in voltage applied to it connected in said circuit, and means for increasing the voltage applied to said element in accordance with increase in load on said machine.

3. A quick acting voltage regulator for a dynamo electric machine comprising, a field winding circuit for said machine, a resistance element whose electrical resistance decreases instantaneously with increases in voltage applied to it connected in said excitation controlling circuit, a current transformer in the external circuit of said machine and means connecting the secondary winding of said current transformer across said resistance.

4. In combination, an alternating current circuit, a dynamo electric machine connected to said circuit, an excitation controlling circuit for said machine, a resistance element whose electrical resistance varies inversely with changes in voltage applied thereto connected in said excitation controlling circuit, a current transformer connected in said first mentioned circuit, and a full wave rectifier connected between said element and the secondary winding of said current transformer.

In witness whereof, I have hereunto set my hand this 20th day of December, 1930.

EUGEN HOROWITZ.